July 17, 1951 W. C. HUEBNER 2,560,696
PHOTOPRINTING APPARATUS
Filed Dec. 8, 1948 4 Sheets-Sheet 3
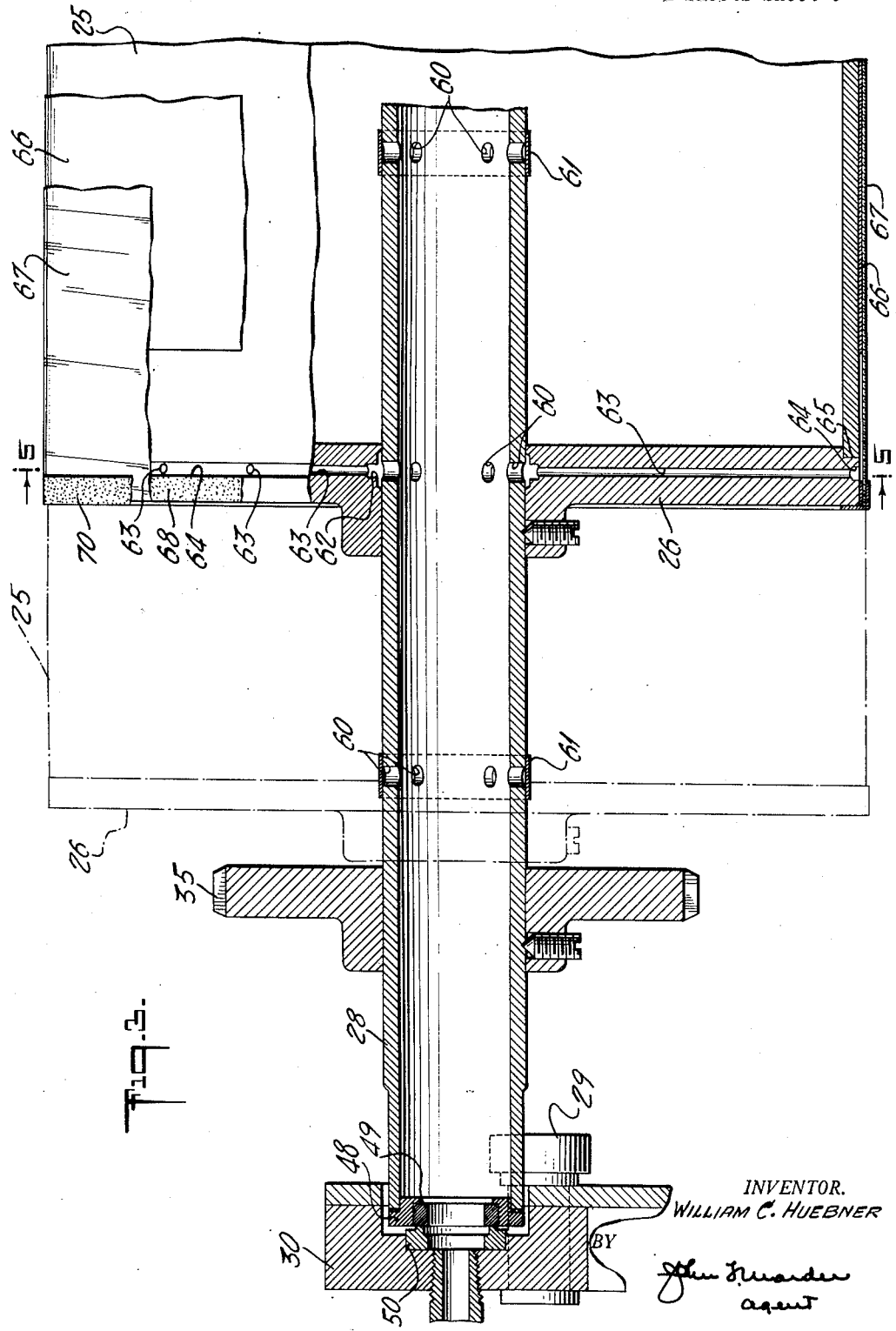
INVENTOR.
WILLIAM C. HUEBNER

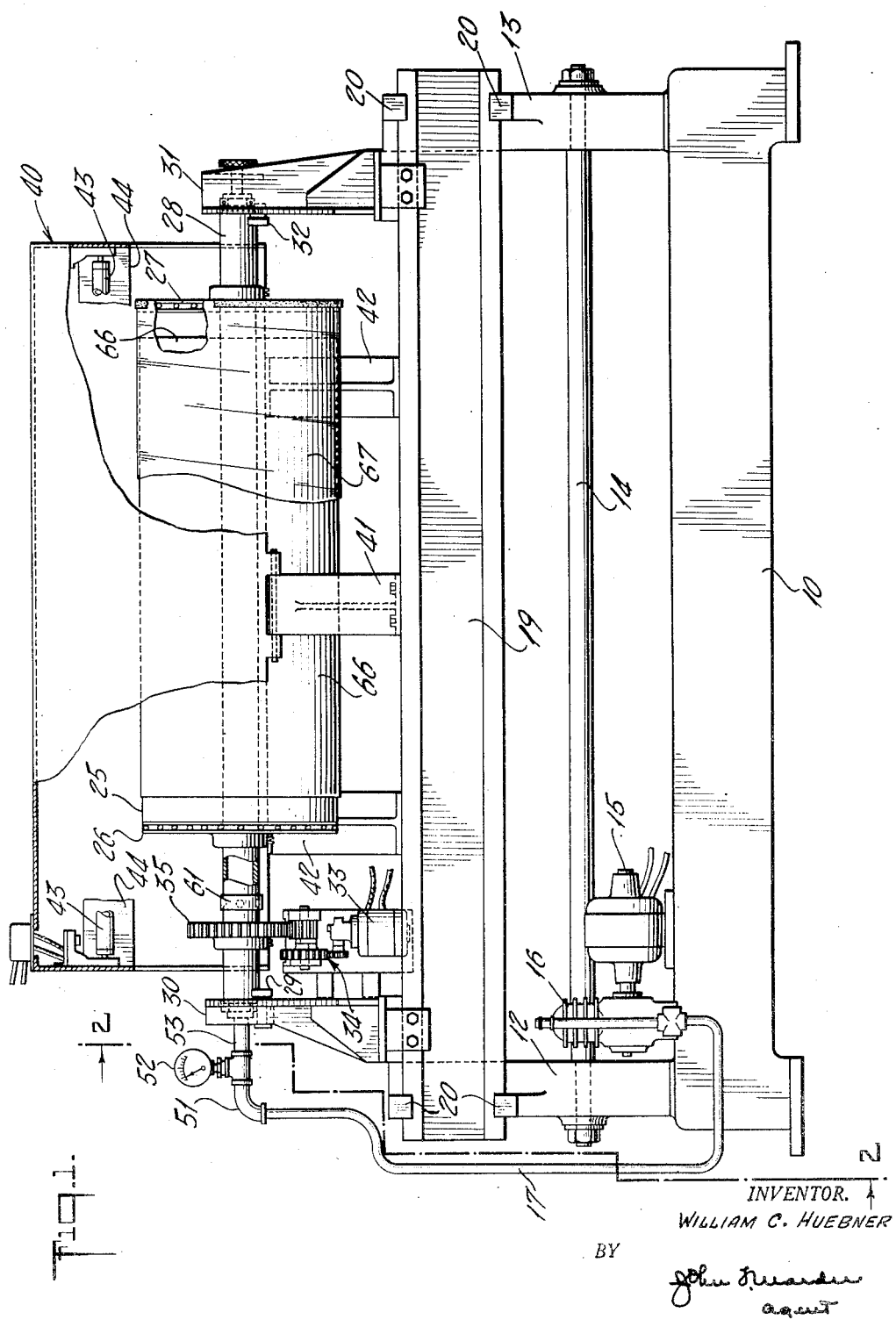

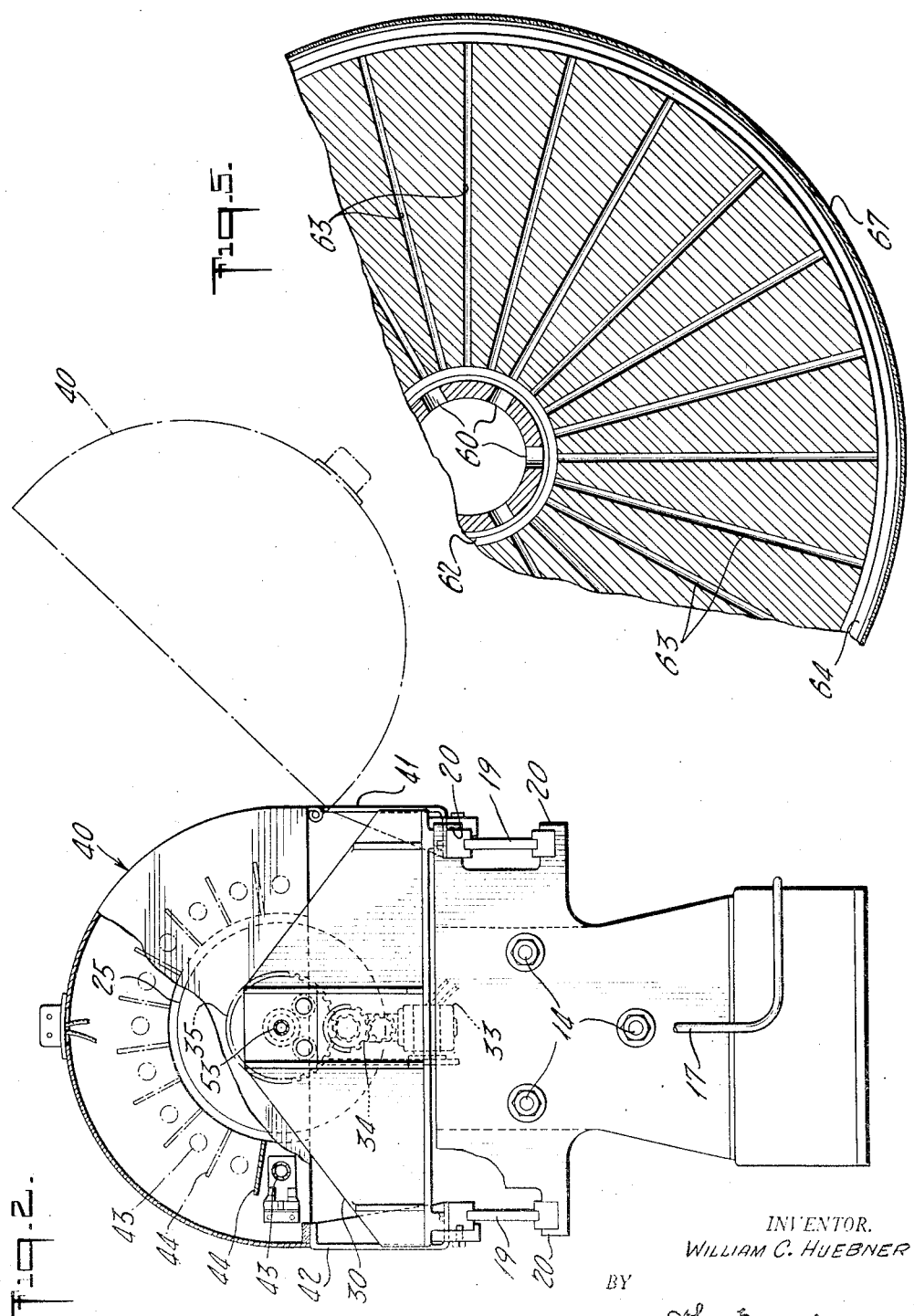

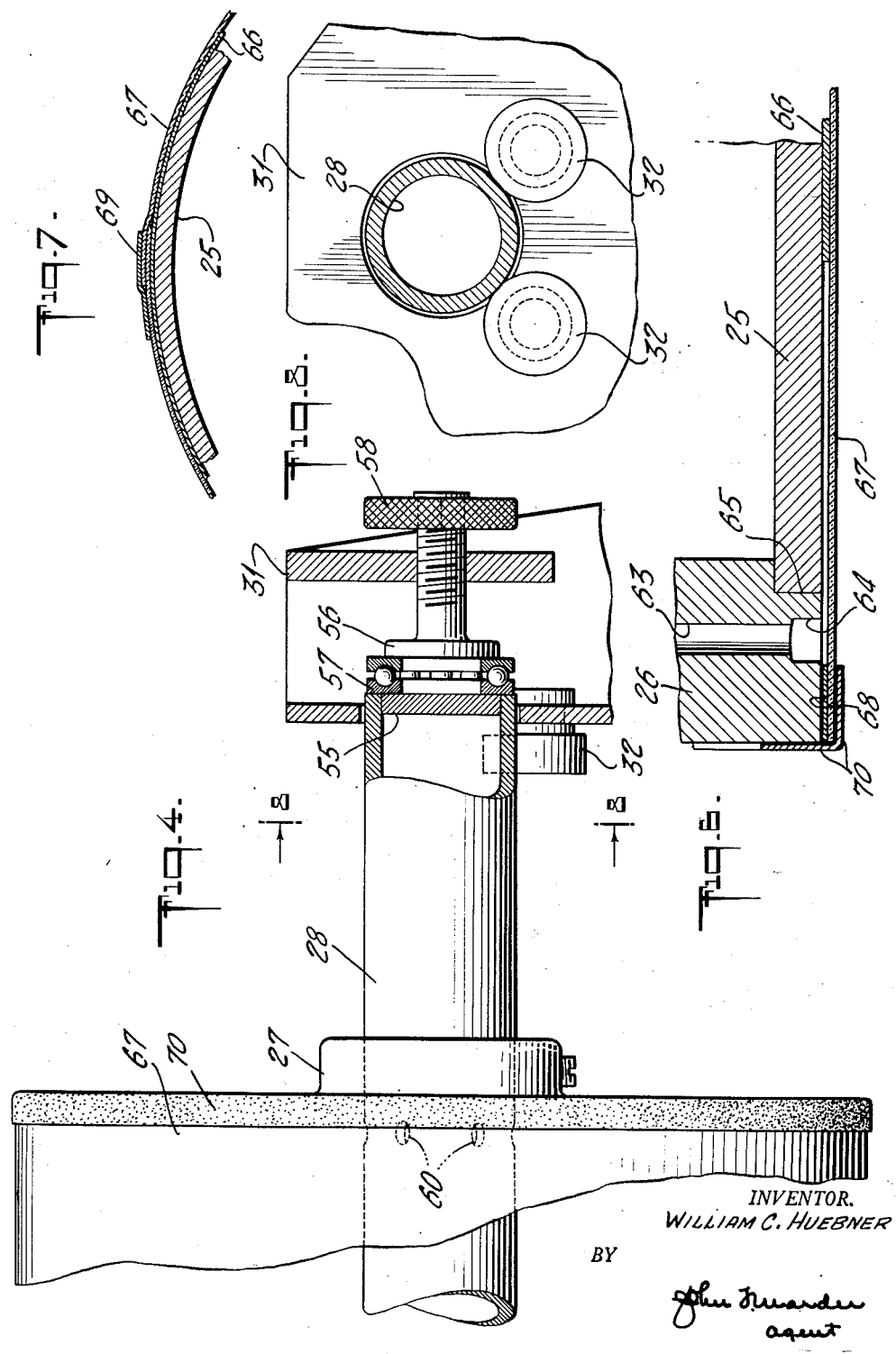

Patented July 17, 1951

2,560,696

UNITED STATES PATENT OFFICE 2,560,696

PHOTOPRINTING APPARATUS

William C. Huebner, New York, N. Y.

Application December 8, 1948, Serial No. 64,143

4 Claims. (Cl. 95—76)

1

This invention relates to improvements in photoprinting apparatus and in particular to apparatus for photoprinting on relatively large cylindrical surfaces such as are used in the graphic arts, where the surface being processed provides a form useful for the reproduction of images.

It is the principal object of the present invention to provide a cylindrical surface contact photoprinter for making fine quality contact photoprints upon sensitized cylindrical surfaces.

Another object of the invention is to provide a photoprinting apparatus in which a film negative or positive may be accurately and uniformly drawn against the surface of a printing cylinder under the influence of vacuum, and so maintained during exposure rotation of the cylinder.

A further object of the invention is to provide a cylindrical vacuum photoprinter which may be quickly and easily adjusted for sensitized cylinders of different lengths and of different diameters, and wherein an operator is not required to manipulate complex mechanical devices in so doing.

In the past, attempts have been made to accomplish high quality photoprinting on cylindrical surfaces, however, to a large degree these attempts have been frustrated by a lack of close and uniform contact between the emulsion surface of a photo-mechanical negative or positive with the sensitized surface of the cylinder. Any non-uniformity of contact during exposure finally results in undercutting and, in many cases, the exposure system itself adds to the undercutting disadvantage in that the rays of light are not properly projected to the cylindrical surface.

To overcome such difficulties, I provide apparatus with which printing cylinders may be exposed uniformly and accurately, particularly where the entire surface of the cylinder is to be covered by a single exposure. My improved photoprinter includes, in part, provision whereby the cylinder is mounted on a hollow shaft between a pair of special cylinder engaging heads. The cylinder heads are joined with a source of vacuum supply and, by novel means hereinafter explained, uniform distribution of vacuum is obtained to draw the film negative or positive securely against the cylindrical printing surface. By arranging an exposure hood over the top half of the cylinder and by uniformly rotating the cylinder with respect to the hood, a prescribed exposure may be produced which will result in a fine quality printing image on the surface of the cylinder. Vacuum is applied during rotation of the cylinder in an effective and convenient

2 manner, and suitable provision is made to accommodate cylinders of different diameters and different lengths. Baffles in the light hood prevent unwanted distribution of light which might otherwise result in undercutting even with the film negative or positive closely adhered to the cylinder.

It will be understood that the apparatus of my invention, as described herein, is a preferred physical embodiment and that various changes in the size, shape and disposition of elements may be made by persons skilled in the art without departing from the invention as defined in the sub-joined claims.

In the drawings,

Figure 1 is a front elevation view of the apparatus of my invention, with certain parts cut away, Figure 2 is an end elevation view, partly in cross-section, taken from the left side of the apparatus of Figure 1 on lines 2—2, Figure 3 is an enlarged fragmentary view of the cylinder, the left hand cylinder head, and the cylinder shaft showing additional details of the apparatus of my invention, Figure 4 is a fragmentary view showing the right hand end of the cylinder shaft together with parts associated therewith, Figure 5 is a fragmentary cross-section view taken through the cylinder head of Figure 3 on lines 5—5, Figure 6 is an enlarged fragmentary section view showing a portion of the cylinder head and cylinder as prepared for the application of vacuum, Figure 7 is a fragmentary cross-section view of the cylinder used with my invention showing details relating to the application of a film negative thereover, Figure 8 is a cross-section view taken on lines 8—8 of Figure 4 showing the cylinder shaft support.

In the drawings, Figure 1, the photoprinter of my invention is supported on an elongated cast base 10 on which are erected a pair of vertical end frames 12, 13. Connecting the end frames are three spaced tie rods 14, see also Figure 2, which enhance the rigidity of the assembly. The top surface of base 10 provides a convenient location for mounting an electrical motor 15 driving a compressor 16 to which is connected a vacuum line 17 which leads up along the end of the machine to the cylinder assembly, to be described.

A pair of side frame members 19, shaped as I beams, extend longitudinally of the assembly for supporting the cylinder and parts associated therewith, these frames being rigidly secured in opposed pairs of supporting lugs 20 integral with end frames 12 and 13.

A hollow printing cylinder 25, the surface of which is to be exposed, is engaged by left and right hand removable cylinder heads 26, 27 which, in turn, are adjustably secured on a hollow cylinder shaft 28. The left hand end of cylinder shaft 28 rests on a pair of supporting rollers 29 mounted for rotation in bracket 30 which spans the frame members 19 and which is suitably secured thereto. In like fashion, a right hand bracket 31 secured at the other end of the machine across frame members 19 carries a second pair of supporting rollers 32 to rotatably engage the right hand end of the cylinder shaft. Provision is made to turn shaft 28 as by means of an electric motor 33 and a reducing spur gear assembly 34, the drive terminating in a large spur gear 35 removably attached to the shaft. Suitable switching means, not shown, may be provided to effect one complete revolution of the shaft and cylinder assembly during exposure.

A lamp housing 40, extending over the top half of the cylinder for its entire length is provided with suitable hinge brackets 41 fastened to front frame 19, thus permitting the hood to swing upwardly and away from the cylinder during the installation thereof. A pair of support brackets 42 fastened to the rear side of the lamp housing rest on the rear frame member 19 when the housing is in operating position. A series of elongated tubular lamps 43, secured within the housing and separated from each other by radial baffles 44, see Fig. 2, provide a source of illumination with the light rays from the lamps directed substantially normal to the surface of the cylinder. Suitable electrical connections and switching means are provided at the top of the housing, see Fig. 1, to control energization of the lamps.

Referring now to Figure 3 for details of the cylinder assembly, the open left hand end of the tubular cylinder shaft 28 is sealed with a metal plug 48 having a soft metal central ring insert 49. Recessed within bracket 30 is a similar and mating ring insert 50 which is devised to provide sealing rotary contact with the ring insert 49. Vacuum supply from line 17, Figure 1, is directed through a pipe elbow 51, a vacuum gauge 52 and a nipple 53 and, when the cylinder shaft 28 is biased to the left, with rings 49 and 50 in contact, vacuum may be directed to the inside space within shaft 28 during cylinder shaft rotation.

On the right hand end of the cylinder shaft, Figure 4, is a closure plug 55 which completely seals this end of the shaft against loss of vacuum. Thrust may be provided against the right hand end of the shaft by means of the abutment member 56 threadedly fixed in bracket 31 which engages thrust bearing 57 resting against the shaft. By turning the hand wheel 58 on member 56 clockwise or counter-clockwise, the thrust may accordingly be increased or decreased to provide biasing pressure for effecting rotary vacuum contact on the left hand end of the shaft, heretofore described.

Several groups of radially disposed holes 60 in shaft 28, arranged at specific locations with respect to the longitudinal dimension of the shaft according to standard cylinder lengths, provide for further communication of vacuum from the inside of the shaft to the periphery of cylinder heads 26, 27. It will be noted by reference to Figure 3 that three series of holes 60 are provided for the left hand cylinder head for three lengths of cylinder, although any other similar set-up may be had. When not in use, as shown in two end positions, these radial vacuum apertures may be sealed off as by means of a collar or adhesive tape 61. When used for communication with the cylinder heads the vacuum apertures 60 align with annular grooves 62 in the bore of the cylinder heads. From these annular grooves lead a series of small radial passages or ducts 63, more clearly shown in Figure 5, which terminate in annular grooves 64 on the outside peripheral surfaces of the cylinder heads.

Cylinder heads 26 and 27 are carefully fitted to shaft 28 to avoid loss of vacuum and they mate with the hollow cylinder 25 at hermetically sealed joints 65; and directly over the cylinder is wrapped a photographic negative or positive 66 which is to be printed down on the sensitized cylindrical surface. Superimposed over the negative or positive 66 and extending for the entire periphery and length of the cylinder, including the cylinder heads, is a flexible transparent backing sheet 67 which is slightly spaced from the cylinder heads by means of peripheral tapes 68, see Figure 6, located between the grooved passages 64 and the outside faces of the cylinder heads. A hermetic seal is maintained at the longitudinal lapped edges of the backing sheet on the cylinder by the longitudinally disposed adhesive tape 69, Figure 7, and over the ends of the transparent backing sheet at both cylinder heads by means of tapes 70, see Fig. 6, which extend both over the transparent backing sheet and over the ends of the cylinder heads. Thus, I provide for communication between the peripheral grooves 64 and the sealed space under the backing sheet, at both ends of the cylinder, whereby air may be exhausted between the backing sheet and the cylindrical surface thus insuring close, uniform contact between the negative or positive and the cylindrical surface.

In the use of the photoprinter of my invention, the cylinder heads are first engaged with the prepared printing cylinder, whereupon the shaft is mounted therewith and secured to the cylinder heads, the right hand cylinder head being positioned at the radial apertures 60 and the left hand head at one of the several locations provided for radial vacuum communication. All other radial passages are closed off as by the use of tape or the like. With spur gear 35 loosely in position on the shaft, the assembly of cylinder and shaft is then placed in position with the shaft ends resting on the sustaining rollers, and with the left hand end of the shaft abutting the vacuum sealing ring in bracket 30. The negative is then placed in registered position, emulsion side down, on the surface of the cylinder and the transparent backing sheet is attached thereover in the manner previously described. Abutment plug 56 is then threaded up to firm contact with the right hand end of the shaft whereafter spur gear 35 is fixed in position and the exposure hood is dropped down to exposure position. As shown particularly in Figure 2, illumination from lamps 43 will be directed substantially radially to the cylinder surface and excessive or detrimental angularity is avoided by the radial baffles interposed between successive lamps. I prefer to use separate hoods for cylinders of different diameters, whereby the lamp position and the baffles will give optimum results, although a range of diameters may be accommodated with each single hood by providing radial adjustment for the lamp and baffles.

With the vacuum system in operation and with the vacuum guage registering an adequate value, the lamps and the motor drive are switched "on" for the desired period of exposure time. The motor drive will rotate the cylinder for a complete revolution after which the lamps will be turned "off," the hood swung away, and the cylinder removed and disassembled for subsequent processing. In cases where a single negative is being printed down on the cylinder and where this negative may be completely exposed without rotation of the cylinder, the operations of rotating the cylinder may be dispensed with.

As an example of the use of this equipment, my improved photoprinter may be used in newspaper procedures, wherein all display types and text-types comprising four pages of a newspaper, including illustrations, may be accomplished quickly and uniformly with dependable control; the entire cylindrical printing surface being finished at a substantial saving in time and cost as compared with other known procedures. This operation is particularly valuable for newspapers because of the time schedules encountered in such work. Furthermore, it is alternatively possible for the apparatus of my invention to use a masterfilm, upon which are registered various passages of text matter or illustrations in positive or negative form, the masterfilm being wrapped around the sensitized cylinder in location in the same manner as is a large multiple page film.

Although I have shown and described what I believe to be a preferred embodiment of my invention, it is to be understood that this is merely illustrative, and that changes and modifications may be made by persons skilled in the art which come within the scope of the appended claims.

I claim:

1. In a photoprinting apparatus of the character described, the combination of a hollow shaft having radial openings at predetermined spaced locations therealong communicating with the interior of said shaft, a pair of cylinder heads each having a central bore adapted to receive said shaft, the said heads each having radial ducts therethrough providing communication from the bore to a peripheral groove, means to removably secure said heads to the shaft at spaced locations therealong with the said ducts in communication with the radial openings in said shaft, means on said heads for removably supporting a cylinder therebetween which cylinder has a light sensitive surface on which a photographic reproduction is to be made from film placed thereon, a light transmitting flexible sheet adapted to be disposed entirely around said cylinder and film and sealed to said heads without closing said grooves, means to apply a partial vacuum to said shaft thereby exhausting the air from between said cylinder and sheet so that the latter and the film are smoothly and uniformly forced against said cylinder by the external air pressure, a light source adjacent an arcuate portion of said cylinder and extending the entire length thereof, and means to rotate said shaft thereby causing all portions of the light sensitive surface of said cylinder to be sequentially brought adjacent the said light source.

2. The combination as defined in claim 1 and wherein the means for applying a partial vacuum to said shaft comprises means at one end of the latter providing a separable coupling with a stationary conduit, and movable means adjacent the other end of said shaft applying an axial thrust thereon in the direction of said separable coupling.

3. In an apparatus for effecting photographic reproduction of film upon the sensitized circumferences of hollow cylinders which cylinders have different predetermined axial lengths, the combination of a hollow shaft having a plurality of radial openings communicating with the interior thereof and with the said openings being spaced longitudinally along said shaft at distances corresponding to the different predetermined lengths of the cylinders to be supported, a pair of cylinder heads having radial ducts therethrough, means to removably connect said heads to said shaft with a sensitized cylinder supported between the heads and with the said radial ducts communicating with spaced ones of the radial openings in said shaft, means to seal those radial openings in said shaft which are not in communication with said heads, means removably rotatably supporting said shaft with its interior in communication with a source of vacuum, a transparent sheet adapted to entirely surround the periphery of said heads and a supported cylinder in air-tight relationship with a film to be reproduced between said sheet and cylinder, means to prevent said sheet from closing said ducts so that air is exhausted from between said cylinder and sheet causing the latter to firmly and uniformly hold said film in intimate contact with said cylinder, a source of light adjacent an arcuate portion of the supported cylinder and extending the entire length thereof, and means to rotate said shaft thereby sequentially bringing all portions of the light sensitive surface of said cylinder adjacent said light source so that the film is uniformly reproduced upon the cylinder.

4. The combination as defined in claim 3 and wherein the means for providing communication of the interior of said shaft with a source of vacuum comprises means at one end of said shaft providing a separable coupling with a stationary conduit, and movable means adjacent the other end of said shaft applying an axial thrust thereon in the direction of said separable coupling.

WILLIAM C. HUEBNER.

REFERENCES CITED

The following references are of record in the file of this patent:

UNITED STATES PATENTS

| Number | Name | Date |
|---|---|---|
| 601,883 | Schwarz | Apr. 5, 1898 |
| 2,091,280 | Huebner | Aug. 31, 1937 |
| 2,267,646 | Gorig | Dec. 23, 1941 |
| 2,317,348 | Wekeman | Apr. 27, 1943 |
| 2,417,496 | Huebner | Mar. 18, 1947 |

FOREIGN PATENTS

| Number | Country | Date |
|---|---|---|
| 462,331 | Germany | July 9, 1928 |